US010937205B2

United States Patent
Bagherzadeh et al.

(10) Patent No.: US 10,937,205 B2
(45) Date of Patent: Mar. 2, 2021

(54) DETECTION OF INFARCTS USING TRAINED NETWORK

(71) Applicant: Siemens Healthcare GmbH, Erlangen (DE)

(72) Inventors: Pooyan Sahbaee Bagherzadeh, Mount Pleasant, SC (US); Saikiran Rapaka, Pennington, NJ (US); Puneet Sharma, Princeton Junction, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 115 days.

(21) Appl. No.: 16/181,442

(22) Filed: Nov. 6, 2018

(65) Prior Publication Data
US 2020/0143571 A1    May 7, 2020

(51) Int. Cl.
*G06T 11/00*    (2006.01)

(52) U.S. Cl.
CPC .. *G06T 11/003* (2013.01); *G06T 2207/20081* (2013.01); *G06T 2207/20084* (2013.01); *G06T 2207/30004* (2013.01)

(58) Field of Classification Search
CPC .... A61B 5/05; A61B 5/32; A61B 5/55; G06T 15/08
See application file for complete search history.

(56) References Cited

U.S. PATENT DOCUMENTS

| | | | |
|---|---|---|---|
| 8,649,844 B2* | 2/2014 | Masumoto | A61B 6/503 600/407 |
| 9,785,866 B2* | 10/2017 | Hua | G06N 20/00 |
| 10,540,803 B2* | 1/2020 | Westerhoff | G06T 15/08 |

FOREIGN PATENT DOCUMENTS

EP    2443998 A1    4/2012

OTHER PUBLICATIONS

Mannil, Manoj, et al. "Texture analysis and machine learning for detecting myocardial infarction in noncontrast low-dose computed tomography: unveiling the invisible." Investigative radiology 53.6 (2018): 338-343.

* cited by examiner

*Primary Examiner* — Joshua L Schwartz (57) ABSTRACT

A system and method includes acquisition of a first plurality of images, determination, for each of the first plurality of images, of whether an infarct is depicted in the image and generating a label associated with the image based on the determination, acquisition of a second plurality of non-contrast-enhanced computed tomography images, determination, for each of the second plurality of non-contrast-enhanced computed tomography images, of a corresponding one of the first plurality of images, association of each of the second plurality of non-contrast-enhanced computed tomography images with the label associated with its corresponding one of the first plurality of images, and training of a neural network to output a network-generated label, the training based on the second plurality of non-contrast-enhanced computed tomography images and associated labels.

10 Claims, 10 Drawing Sheets

DETECTION OF INFARCTS USING TRAINED NETWORK

BACKGROUND

Medical imaging systems acquire images of patient volumes. A radiologist uses these images to identify and diagnose disease. For example, in order to assess myocardial infarction, a Magnetic Resonance (MR) images or contrast-enhanced Computed Tomography (CT) images are acquired and a radiologist identifies fibrotic tissue within the acquired images.

Non-contrast CT images are routinely acquired for patients undergoing cardiac assessment, as calcium scoring determined from CT images is a good predictor of cardiac events. Acquiring an additional MR image to detect an infarct is time- and resource-intensive, and alternatively acquiring a contrast-enhanced CT image for the same purpose exposes the patient to additional radiation while also requiring additional time. Due to the ease of acquisition and availability of non-contrast CT images, systems are desired to detect infarcts based on non-contrast CT images.

DETAILED DESCRIPTION

The following description is provided to enable any person in the art to make and use the described embodiments and sets forth the best mode contemplated for carrying out the described embodiments. Various modifications, however, will remain apparent to those in the art.

The embodiments described herein utilize trained artificial neural networks to detect infarcts based on input non-contrast CT images. Advantageously, embodiments may reduce a need for a separate MR acquisition or a separate contrast-enhanced CT acquisition. Consequently, some embodiments significantly reduce the cost of detection (as compared to MR imaging) or reduce radiation dose and contrast agent required for detection (as compared to contrast-enhanced CT imaging).

According to some embodiments, a network is trained based on non-contrast CT images and labels indicating whether or not each image depicts an infarct. A label may also indicate a location of an infarct in a non-contrast CT image in some embodiments. As will be described below, training data labels may be generated based on MR or contrast-enhanced CT images which correspond to the non-contrast CT training images. Network training may employ transfer learning if the amount of training data is limited.

Figure 1:
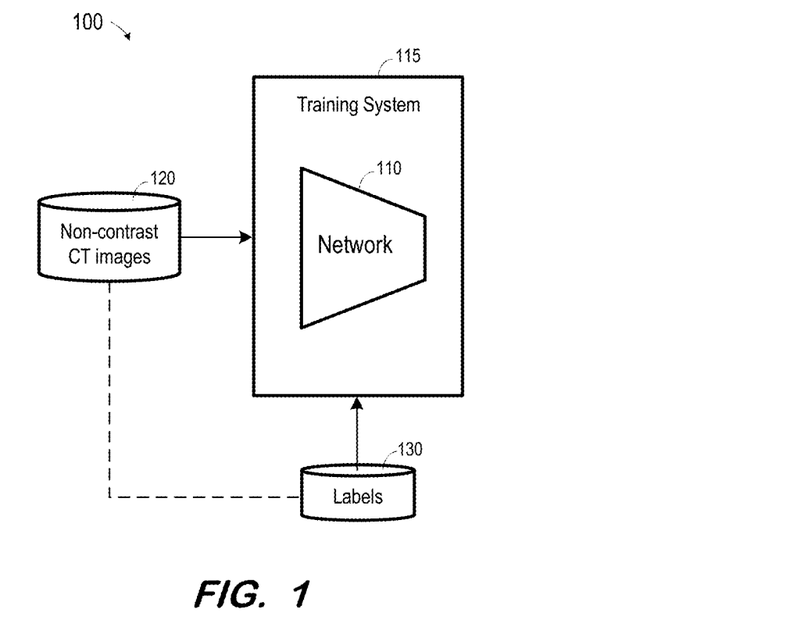
FIG. 1 is a block diagram of a system to train a network to detect infarcts according to some embodiments.

FIG. 1 illustrates system 100 to train a network based on non-contrast CT images according to some embodiments. Non-contrast CT images as described herein may include two-dimensional CT images, three-dimensional CT images (e.g., reconstructed based on acquired two-dimensional images), or CT image "slices" (e.g., slices of reconstructed three-dimensional images). "Non-contrast" indicates a state in which contrast agent is substantially not present in the regions of interest. Accordingly, a non-contrast image may be acquired prior to introduction of contrast agent into a region of interest or after contrast agent has been introduced and enough time has elapsed for the contrast agent to substantially flush out of the region of interest.

Network 110 is trained using training system 115, non-contrast CT images 120 and labels 130. Non-contrast CT images 120 may include one or more images 0 through n, and labels 130 may comprise one or more labels for each image. Typically, data 120 and 130 comprise a large number of data sets and corresponding annotations (i.e., n is a large number).

Although depicted and described herein as non-contrast CT images, images 120 may comprise medical image data acquired using any imaging modality and in any format that are or become known. Examples include but are not limited to single-photon emission computed tomography (SPECT), positron emission tomography (PET), ultrasound, photoacoustic imaging, magnetic particle imaging, optical coherence tomography, optical camera, infrared camera, three-dimensional camera/depth camera, endoscopy, and digital holographic microscopy. Images 120 may comprise raw data acquired using any of the above-listed or other imaging modalities. Each image may include acquisition parameters (e.g., DICOM images).

According to some embodiments, network 110 also receives other training data associated with each non-contrast image 120. The other training data may comprise demographic information associated with the patient depicted in each image 120. The other training data may also or alternatively include segmentation data generated based on each image 120.

One or more labels 130 are associated with each image 120 (and any other associated data as described above), as indicated by the dashed line between images 120 and labels 130. A label 130 may indicate whether or not its corresponding image depicts an infarct. A label 130 may also indicate a location of an infarct in its corresponding image. A label 130 may include any other suitable information which network 110 to be trained to output.

Broadly, network 110 may comprise a network of neurons which receive input, change internal state according to that input, and produce output depending on the input and internal state. The output of certain neurons is connected to the input of other neurons to form a directed and weighted graph. The weights as well as the functions that compute the internal state can be modified by a training process based on ground truth data. Network 110 may comprise any one or more types of artificial neural network that are or become known, including but not limited to convolutional neural networks, recurrent neural networks, long short-term memory networks, deep reservoir computing and deep echo state networks, deep belief networks, and deep stacking networks.

Network 110 may be trained using training system 115 as is known in the art to generate a function to output a label based on input non-contrast CT image data. Training system 115 may comprise any system or systems for training an artificial neural network that are or become known. For example, training system 115 may employ supervised learning, unsupervised learning and/or reinforcement learning used as a function approximator as is known in the context of deep neural networks. Generative adversarial networks may be used including a generative and a discriminative network as is known.

According to some embodiments, trained artificial neural network 110 implements a function. The function may be characterized as a set of parameter values associated with each network node. In one example, the function is represented by parameter values for kernels of a fully convolutional network. The function (e.g., embodied in parameter values of trained convolutional kernels) may be deployed as is known in the art to an external system such as system 200 of FIG. 2.

Figure 2:
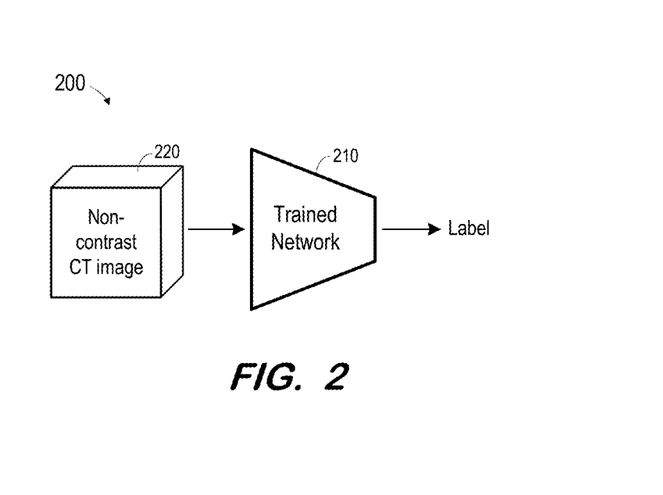
FIG. 2 is a block diagram of a system deploying a trained network to detect infarcts according to some embodiments.

System 200 includes trained network 210. Network 210 may be trained as described above with respect to network 100. Network 210 may comprise any type of computing system to implement the learned functions resulting from the training of network 110 of FIG. 1.

In operation, non-contrast CT image 220 is acquired and input to trained network 210. The format and type of input non-contrast CT image 220 corresponds to the format and type of non-contrast CT images 220 used to train network 110. For example, if network 110 was trained based on three-dimensional CT images, input image 220 consists of a three-dimensional CT image. If network 110 was trained based on sets of slice images, with each set corresponding to a three-dimensional CT image, input image 220 consists of a set of slice images. Moreover, if network 110 was trained using demographic and/or segmentation data associated with each non-contrast CT image, the same type of data is input to trained network 210 along with input image 220.

Network 210 then operates according to the trained model to output one or more labels based on the input image. As described above, the one or more labels may indicate whether an infarct is depicted in the input image(s), a location of any depicted infarct, and any other information which network 210 was trained to output.

Figure 11:
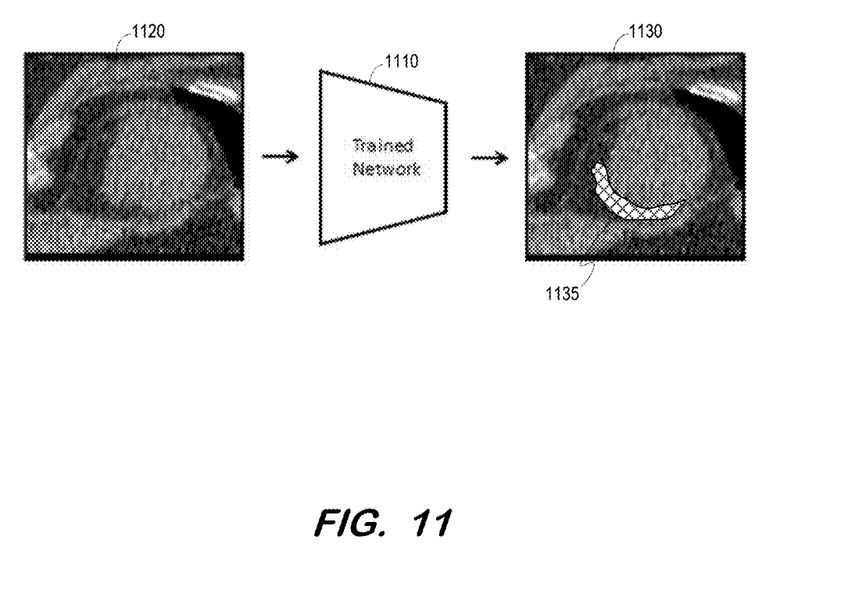
FIG. 11 illustrates generation of a label using a trained network according to some embodiments.

For example, the output may comprise a report which associates the location of the infarct with a segmented organ and/or region, based on coordinates of various structures generated by a segmentation algorithm. In some embodiments, the label may comprise a graphic overlay which indicates a location of an infarct. FIG. 11 depicts trained network 1110 receiving a non-contrast CT and outputting image 1130 in response. Image 1130 includes image 1120 and overlay 1135 located at a detected infarct.

Figure 3:
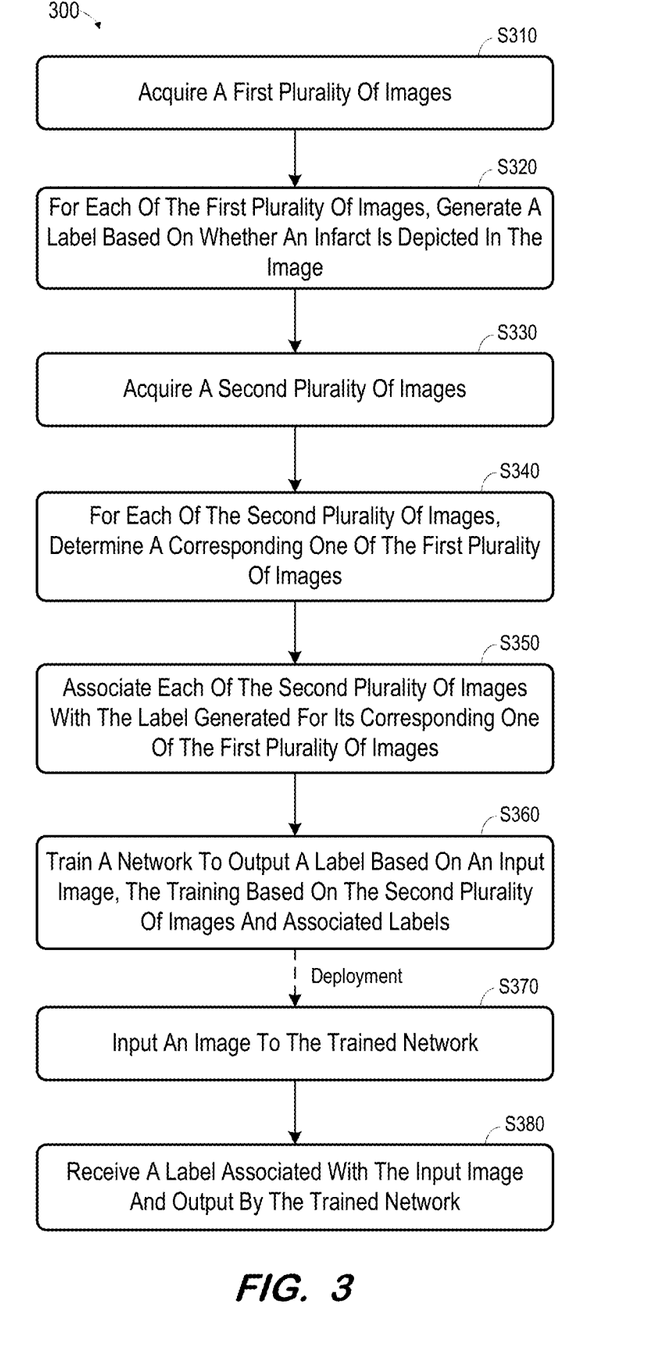
FIG. 3 is a flow diagram of a process to train and deploy a network to detect infarcts according to some embodiments.

FIG. 3 is a flow diagram of process 300 depicted in FIGS. 1 and 2 according to some embodiments. Process 300 and the other processes described herein may be performed using any suitable combination of hardware and software. Software program code embodying these processes may be stored by any non-transitory tangible medium, including a fixed disk, a volatile or non-volatile random access memory, a floppy disk, a CD, a DVD, a Flash drive, or a magnetic tape. Embodiments are not limited to the examples described below.

Initially, at S310, a plurality of images are acquired. The images may be acquired from one or more public or private repositories of images, and may include images acquired for the purposes of training a network as described herein. In some embodiments of S310, the images are slices depicting heart structure. For example, S310 may include acquisition of many MR images or contrast-enhanced CT images, and generation of a plurality of slices of each image.

At S320, a label is generated for each of the plurality of images based on whether an infarct is depicted in the image. In this regard, many if not all of the images may depict at least a portion of a myocardium. According to some embodiments, the images are acquired at S310 using a modality which enables infarct detection using systems which are or become known. For example, the images acquired at S310 may comprise MR images or contrast-enhanced CT images, which are analyzed by a radiologist and/or by automated means to identify infarcts and generate corresponding labels at S320.

A second plurality of images are acquired at S330. The second plurality of images may comprise non-contrast CT images as described with respect to non-contrast CT images 120. Continuing the above example, the second plurality of images may comprise image slices generated from many non-contrast CT images.

Next, at S340, a corresponding one of the first plurality of images is determined for each of the second plurality of images. Generally, each of the second plurality of images is matched to one of the first plurality of images. The matching images may depict a similar portion of a same patient's anatomy from a similar angle. Determination of matching images may comprise segmentation of each image to identify structure depicted therein and registration of the images against one another. Various embodiments for this determination will be described with respect to FIGS. 4-6.

At S350, each of the second plurality of images is associated with the label generated for its corresponding one of the first plurality of images. Accordingly, after S350, each of the second plurality of images is associated with a corresponding label. The images and corresponding labels are then used at S360 to train a network to output a label based on an input image as described with respect to FIG. 1.

The trained network may then be deployed as described with respect to FIG. 2. The computing system in which is the trained network is deployed may be different from the computing system used to train the network. An image is input to the trained network at S370 in the same image format used to train the network. If any additional input data was used during training (e.g., demographic data), that data is also input to the trained network at S370.

By virtue of operation of the trained network, a label associated with the input image is output by the trained network and received at S380. The label may comprise any type of output capable of indicating the existence of an infarct in the input image. The label may comprise text, an audible alarm, a graphic, etc.

According to some embodiments, the user may indicate whether the label is correct (i.e., whether an infarct is depicted in the input image). This information may be used to update the training data. For example, the input image is added to the training set and associated with a label which reflects the user's indication. The training may be re-executed as described above based on the updated training set in order to further refine the trained network.

Figure 4:
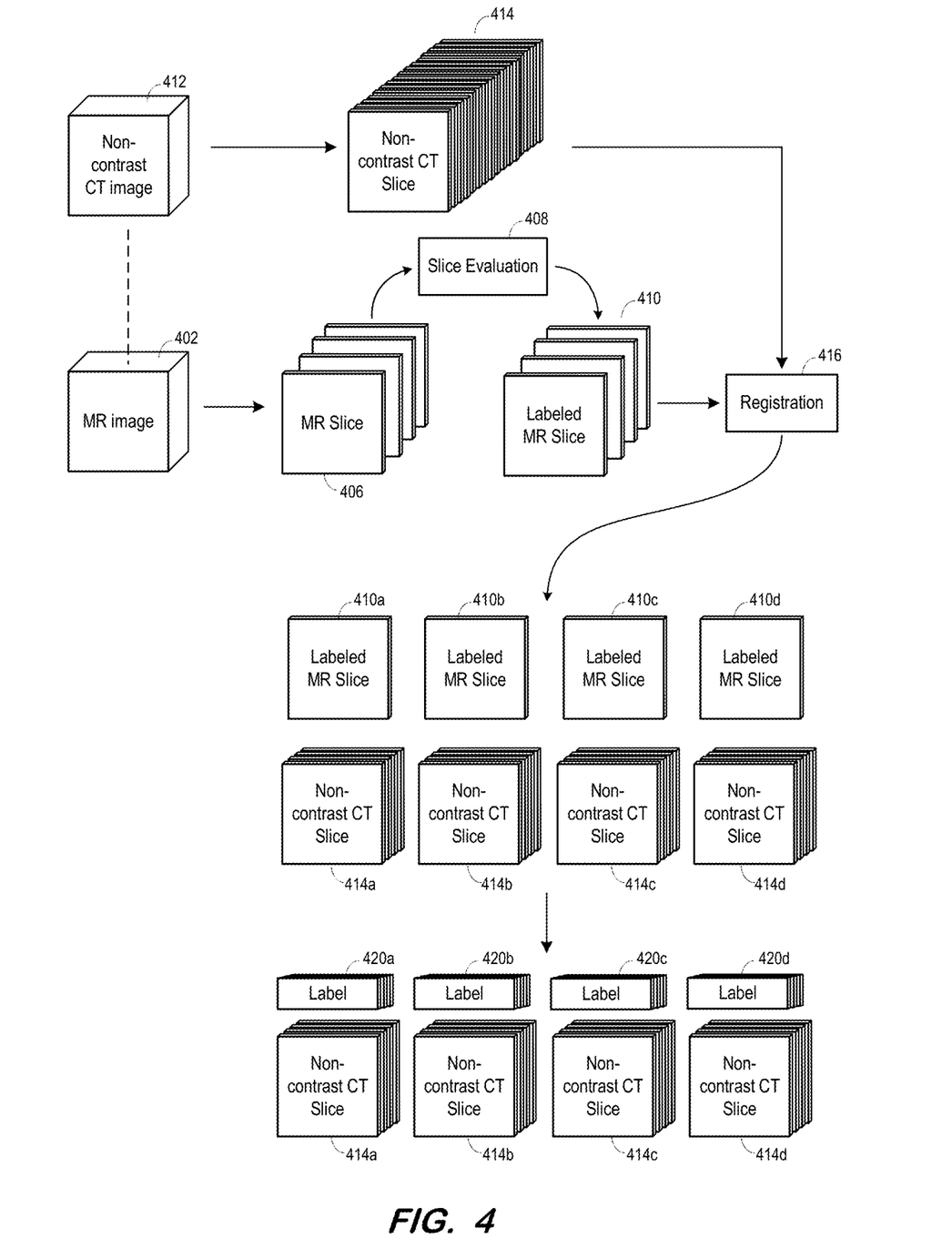
FIG. 4 is a block diagram illustrating the generation of training data according to some embodiments.

FIG. 4 illustrates generation of training data at S310 through S350 according to some embodiments. As shown, MR image 402 is acquired and MR slices 406 are generated therefrom at S310. Each slice 406 is evaluated 408 by a radiologist and/or automated system to determine whether an infarct is depicted therein. Each slice is labeled with its corresponding determination in any suitable manner, resulting in labeled MR slices 410. The determination and label may indicate any other suitable information, such as a location or severity of the infarct.

Non-contrast CT image 412 is acquired and non-contrast CT slices 414 are generated therefrom. A correspondence preferably exists between non-contrast CT image 412 and MR image 402, indicated by a dashed line in FIG. 4. For example, images 402 and 412 may depict a same patient, and may have been acquired close in time.

Registration component 415 determines a correspondence between each of slices 414 and one of MR slices 410. In some embodiments, registration component 415 segments each slice 410 and 414 (or uses segmentation information from previous segmentations of images 402, 412) to identify internal structures (e.g., chambers, ventricles) and uses these structures to determine a corresponding slice 410 for each of slices 414.

As shown, the number of slices 414 may be significantly greater than the number of MR slices 410. Therefore, more than one slice 414 may correspond to a same slice 410. FIG. 4 shows labeled MR slice 410a corresponding to non-contrast CT slices 414a, labeled MR slice 410b corresponding to non-contrast CT slices 414b, labeled MR slice 410c corresponding to non-contrast CT slices 414c, and labeled MR slice 410d corresponding to non-contrast CT slices 414d.

Next, at S350, each of non-contrast CT slices 414 is associated with the label of its corresponding MR slice 410. As depicted in FIG. 4, label 420a of labeled MR slice 410a is associated with each of non-contrast CT slices 414a. Each of non-contrast CT slices 414b-d is similarly associated with labels 420b-d. It should be noted that the FIG. 4 process is performed for many MR images 402 and corresponding non-contrast CT images 412.

Figure 5:
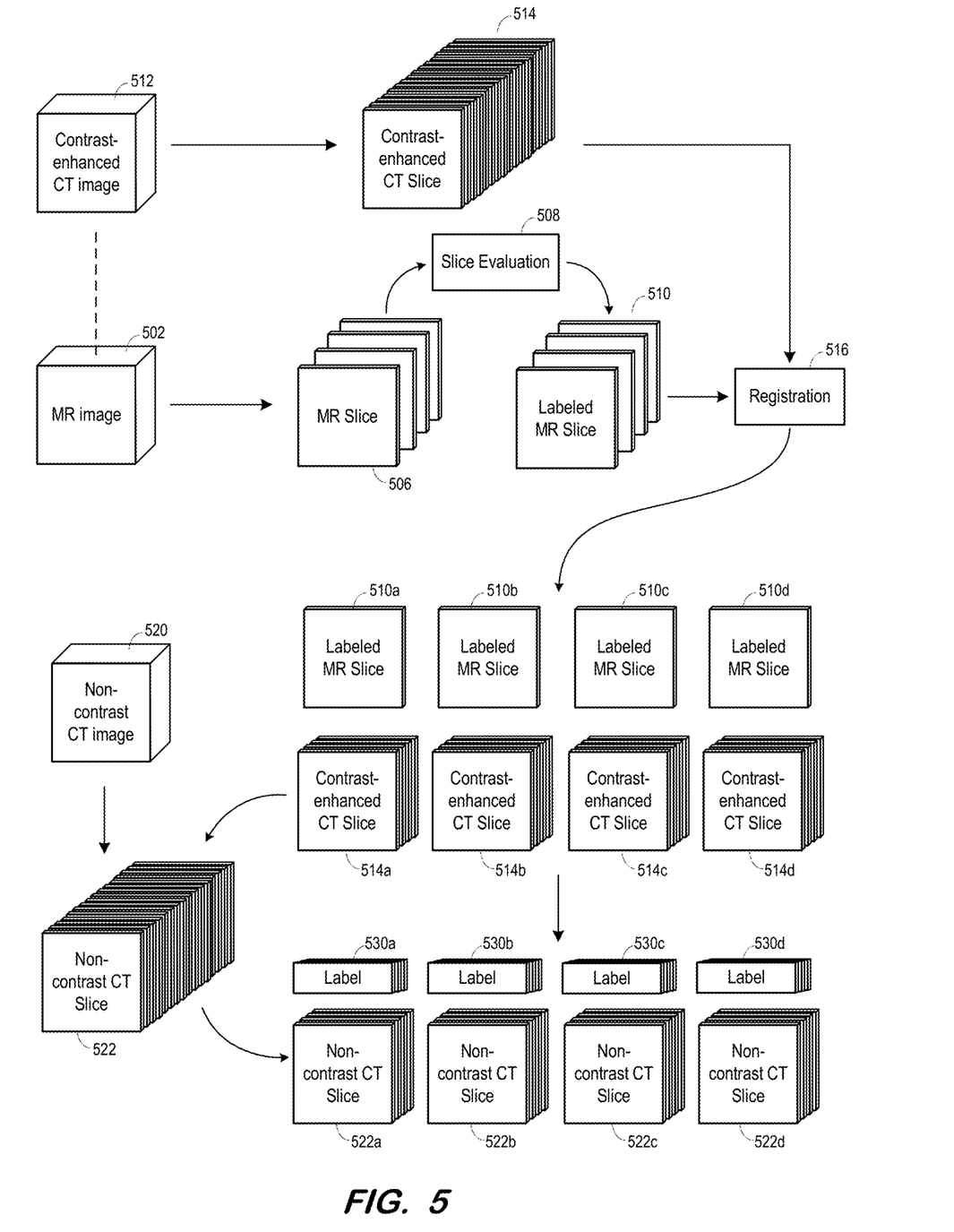
FIG. 5 is a block diagram illustrating the generation of training data according to some embodiments.

FIG. 5 depicts S310-S350 according to some embodiments. MR image 502 is acquired and MR slices 506 are generated therefrom. Each slice 506 is evaluated 508 as described above to determine whether an infarct is depicted therein, and is labeled to generate labeled MR slices 510. Contrary to the system of FIG. 4, contrast-enhanced CT image 512 is acquired and contrast-enhanced CT slices 514 are generated therefrom. Again, a correspondence may exist between contrast-enhanced CT image 512 and MR image 502.

Registration component 516 determines a correspondence between each of slices 514 and one of MR slices 510. The determination may include segmentation and registration of segmented voxels. The use of contrast may facilitate the segmentation of slices 514. Similar to FIG. 4, FIG. 5 shows labeled MR slice 510a corresponding to contrast-enhanced CT slices 514a, labeled MR slice 510b corresponding to contrast-enhanced CT slices 514b, labeled MR slice 510c corresponding to contrast-enhanced CT slices 514c, and labeled MR slice 510d corresponding to contrast-enhanced CT slices 514d.

FIG. 5 also shows non-contrast CT image 520 and non-contrast CT slices 522 generated therefrom. Non-contrast CT image 520 corresponds to contrast-enhanced CT image 512. For example, image 520 may have been acquired immediately before or after acquisition of image 512, although embodiments are not limited thereto.

Due to the correspondence between non-contrast CT image 520 and contrast-enhanced CT image 512, correspondences between non-contrast CT slices 522 and contrast-enhanced CT slices 514 may be efficiently determined. As depicted in FIG. 5, and based on these determined correspondences, each set of slice images 514a-d is substituted with a corresponding set of non-contrast slice images 522a-d. Each of non-contrast slice images 522a-d is then associated with the label 530 of the MR slice 510 which corresponds to its contrast-enhanced CT slice 514.

Figure 6:
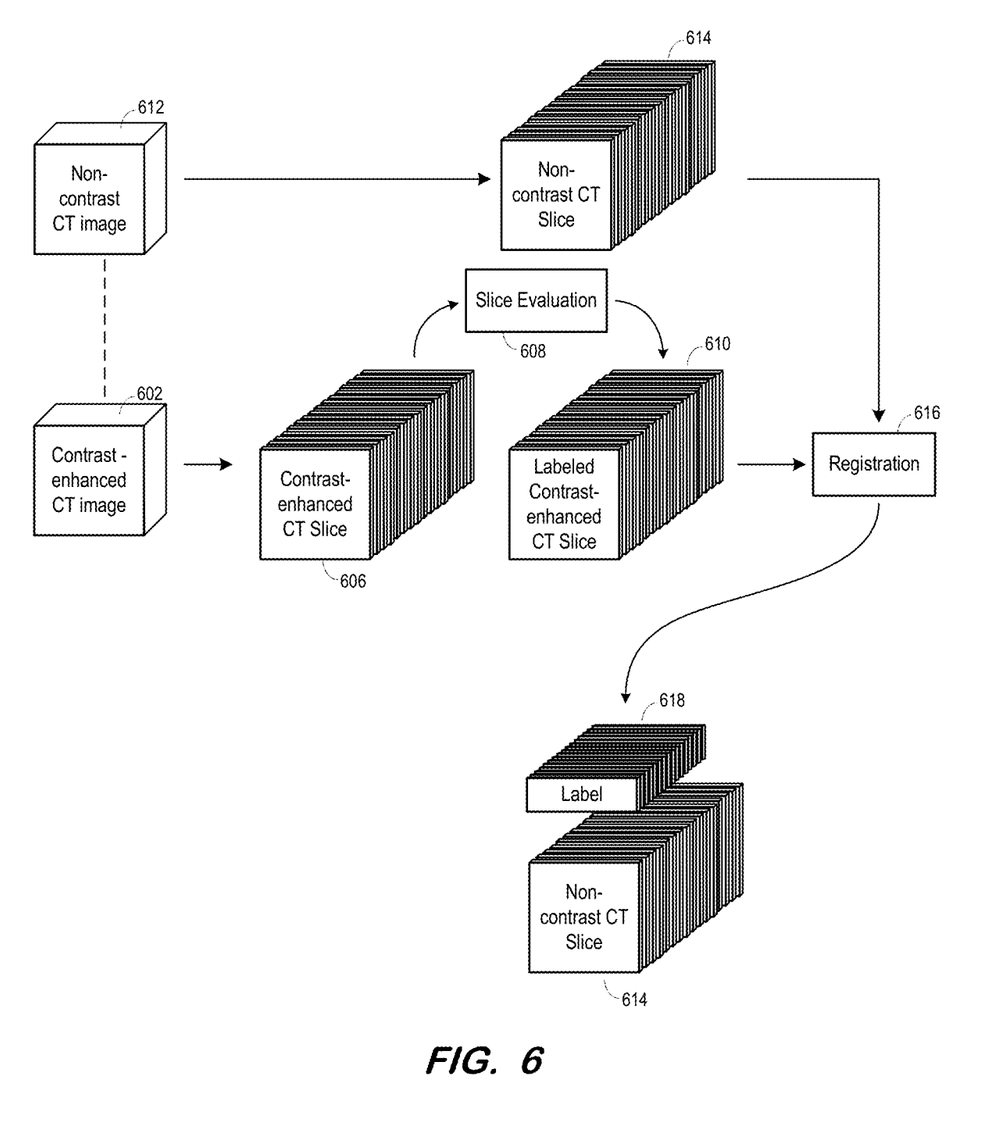
FIG. 6 is a block diagram illustrating the generation of training data according to some embodiments.

FIG. 6 depicts yet another embodiment of S310-S350. Contrast-enhanced image 602 is acquired and slices 606 are generated therefrom. Slices 606 are evaluated 608 to identify infarcts and are labelled accordingly to created labeled contrast-enhanced images 610.

Non-contrast CT image 612 corresponds to contrast-enhanced CT image 602. As described above, image 612 may have been acquired immediately before or after acquisition of image 602. Non-contrast CT slices 614 are generated from non-contrast CT image 612. Next, a corresponding labeled contrast-enhanced CT slice 610 is determined at S340 for each non-contrast CT slice 614. The determination may be performed by registration component 616, and may be facilitated by inherent similarities between slices 614 and slices 610. For example, images 602 and 612 may depict a same patient volume at substantially a same time, may be based on projection images acquired using a same CT imaging system using similar acquisition parameters, and may be reconstructed using a similar reconstruction algorithm.

Each of non-contrast slice images 614 is associated with a label 618 of its corresponding labeled contrast-enhanced CT slice 610 as determined by registration component 616. Embodiments are not limited to the systems illustrated in FIGS. 4-6.

Figure 7:
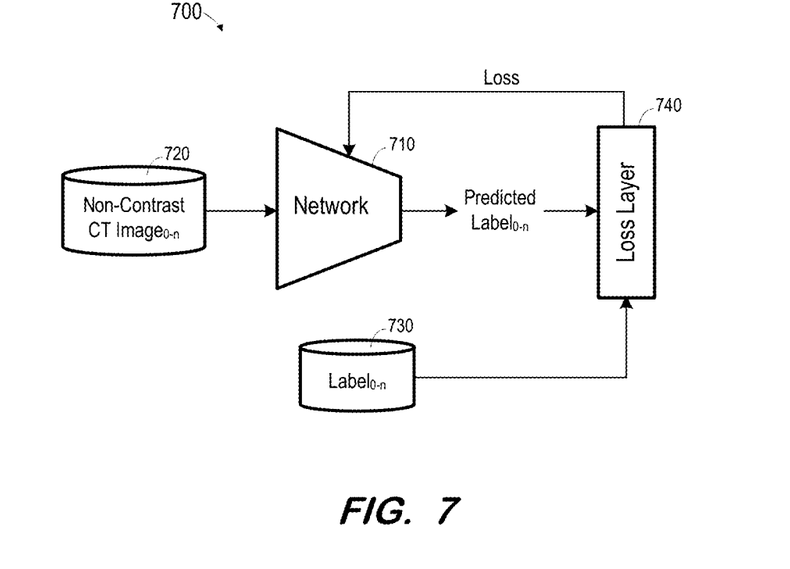
FIG. 7 is a block diagram of a system to train a network according to some embodiments.

FIG. 7 illustrates training architecture 700 to train a network at S360 according to some embodiments. Embodiments are not limited to the type of training depicted in FIG. 7.

During training, network 710 receives non-contrast CT image$_{0-n}$ 720. Based on its initial configuration and design, network 710 outputs a predicted label based on each received non-contrast CT image$_{0-n}$ 720. Loss layer component 740 determines a loss by comparing each predicted label$_{0-n}$ generated based on an input non-contrast CT image$_{0-n}$ 720 to the actual label$_{0-n}$ 730 corresponding to the input non-contrast CT image$_{0-n}$ 720. For example, network 710 generates predicted label$_9$ based on non-contrast CT image$_9$. Loss layer component 740 determines a loss based on a difference between predicted label$_9$ and actual label$_9$ 730 corresponding to non-contrast CT image$_9$. The foregoing is performed for each set of non-contrast CT image$_{0-n}$ to determine a total loss. The loss may comprise an L1 loss, and L2 loss, or any other suitable measure of total loss.

The total loss is back-propagated from loss layer component 740 to network 710, which changes its internal weights in response as is known in the art. The process repeats until it is determined that the total loss has reached an acceptable level or training otherwise terminates.

Figure 8:
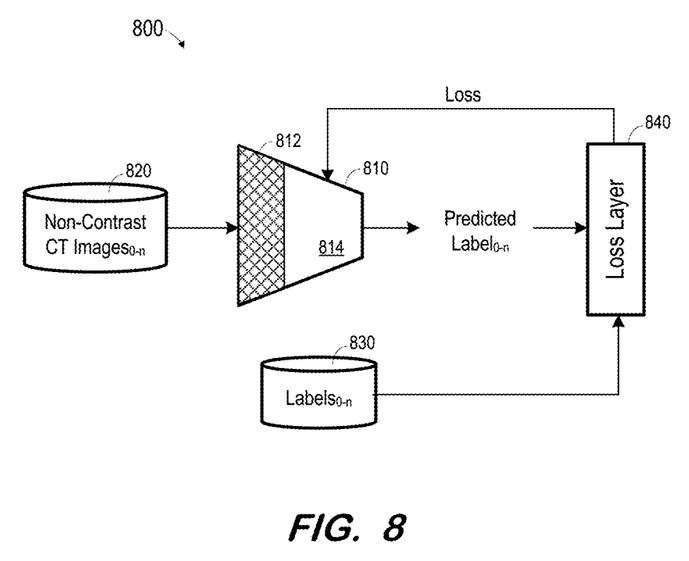
FIG. 8 is a block diagram of a system to train a network using transfer learning according to some embodiments.

FIG. 8 is a block diagram of training architecture 800 employing transfer learning according to some embodiments. Network 810 includes pre-trained layers 812 for detecting lower-level features. Pre-trained layers 812 have been pre-trained using another set of training data to accurately detect these lower level image features.

Training of network 800 may proceed as described above with respect to network 700. However, back-propagation of loss results in modification only of upper layers 814 of network 810. More specifically, the internal weights and architecture of layer 812 remain fixed during training. A training architecture such as architecture 800 may be beneficial in a case that the amount of training data is limited.

Figure 9:
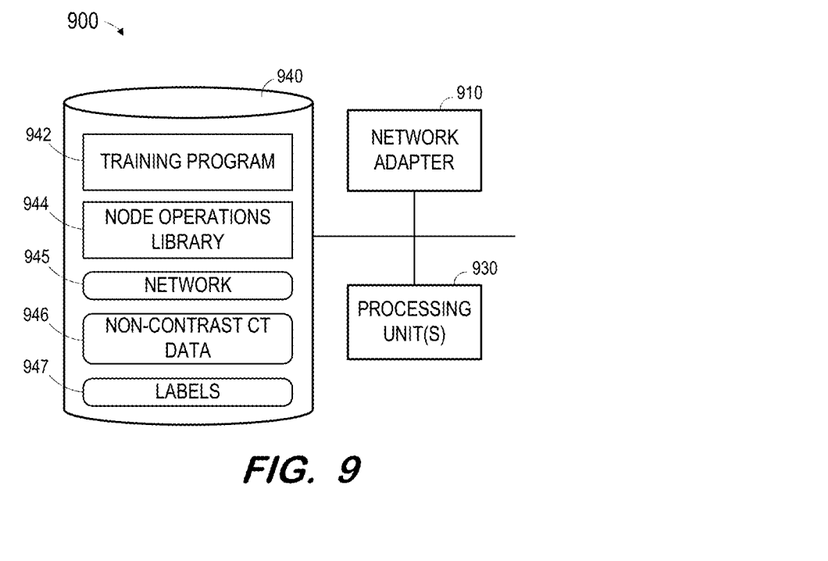
FIG. 9 is a block diagram of a computing system to train a network to detect infarcts according to some embodiments.

FIG. 9 illustrates computing system 900 according to some embodiments. System 900 may comprise a computing system to facilitate the design and training of capsule networks as is known in the art. Computing system 900 may comprise a standalone system, or one or more elements of computing system 900 may be network or cloud, edge or fog-located.

System 900 includes network adapter 910 to communicate with external devices via a network connection. Processing unit(s) 930 may comprise one or more processors, processor cores, or other processing units to execute processor-executable process steps. In this regard, storage system 940, which may comprise one or more memory devices (e.g., a hard disk drive, a solid-state drive), stores processor-executable process steps of training program 942 which may be executed by processing unit(s) 930 to train a capsule network as described herein.

Training program 942 may utilize node operations library 944, which includes code to execute various operations associated with capsule operations as defined in capsule network definitions 945. According to some embodiments, computing system 900 provides interfaces and development software (not shown) to enable development of training program 942 and generation of definitions 945. Storage device 940 also includes non-contrast CT data 946 and labels 947, which may be used by training program as described above to train a network defined within definitions 945.

Figure 10:
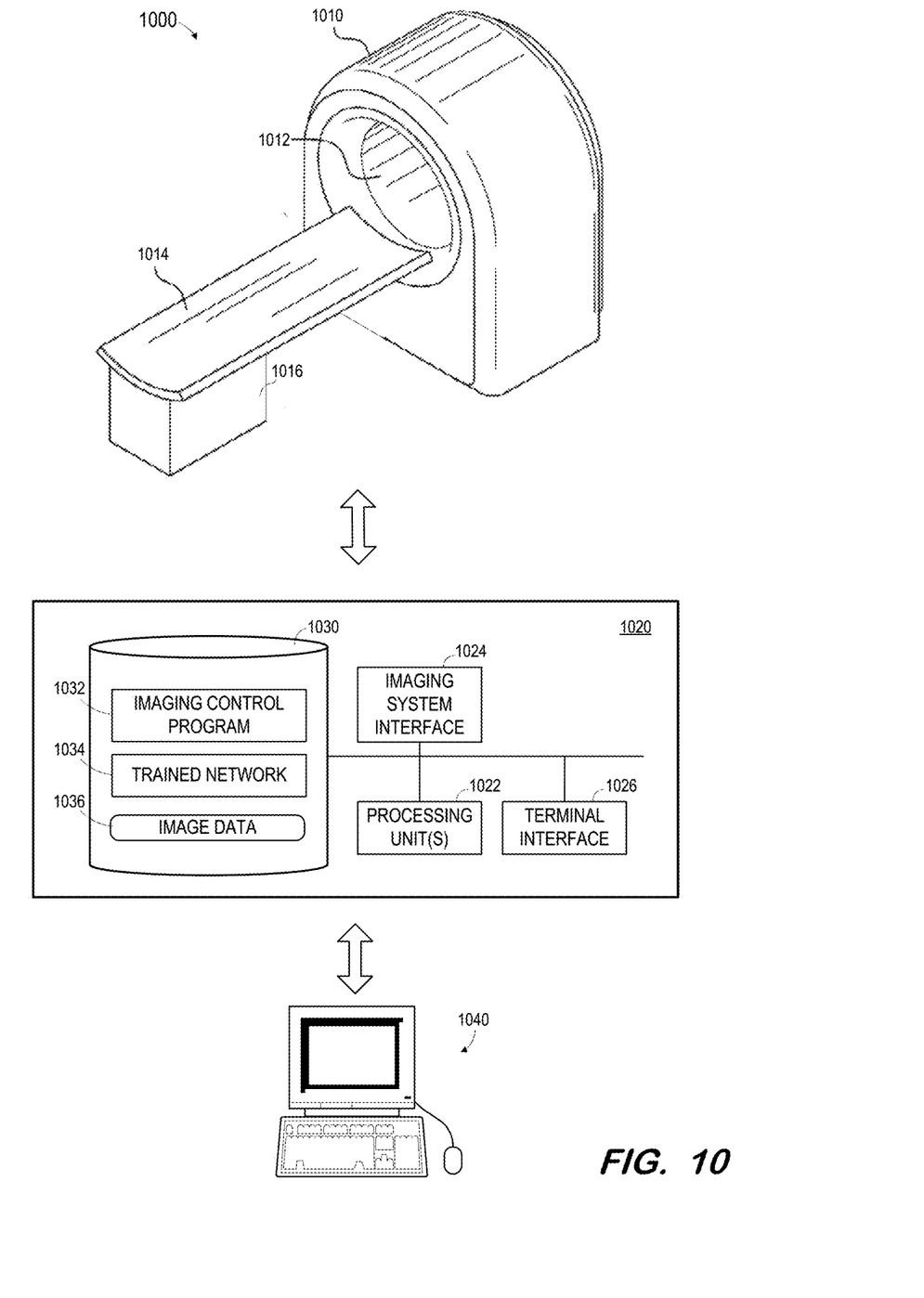
FIG. 10 is a diagram of an imaging system deploying a trained network to detect infarcts according to some embodiments.

FIG. 10 illustrates medical imaging system 1000 in which a trained network may be deployed according to some embodiments. Generally, imaging system 1000 may acquire a non-contrast CT image of a patient and input the image to a trained network as described herein in order to generate one or more associated labels as described above. Embodiments are not limited to system 1000 or to any imaging system. For example, a separate computing system may receive images from an imaging system or from a picture archiving and communications system and input those images to a trained network implemented by the separate computing system in order to generate the one or more labels.

System 1000 includes gantry 1010 defining bore 1012. As is known in the art, gantry 1010 houses CT imaging components for acquiring CT image data. The CT imaging components may include one or more x-ray tubes and one or more corresponding x-ray detectors.

Bed 1014 and base 1016 are operable to move a patient lying on bed 1014 into and out of bore 1012. Movement of a patient into and out of bore 1012 may allow scanning of the patient using the CT imaging elements of gantry 1010.

Control system 1020 may comprise any general-purpose or dedicated computing system. Accordingly, control system 1020 includes one or more processing units 1022 configured to execute processor-executable program code to cause system 1020 to operate as described herein, and storage device 1030 for storing the program code. Storage device 1030 may comprise one or more fixed disks, solid-state random access memory, and/or removable media (e.g., a thumb drive) mounted in a corresponding interface (e.g., a USB port).

Storage device 1030 stores program code of imaging control program 1032. One or more processing units 1022 may execute imaging control program 1032 to, in conjunction with imaging system interface 1024, cause a radiation source within gantry 1010 to emit radiation toward a body within bore 1012 from different projection angles, and to control a corresponding detector to acquire two-dimensional CT data. The acquired data may be stored in memory 1030 as image data 1036.

One or more processing units 1022 may also execute code implementing trained network 1034. The code may be exported by system 900 after training of a network. The code may be executed to receive image data from image data 1036 and to generate a label based thereon.

An acquired non-contrast CT image and its associated generated label may be transmitted to terminal 1040 via terminal interface 1026. Terminal 1040 may comprise a display device and an input device coupled to system 1040. In some embodiments, terminal 1040 is a separate computing device such as, but not limited to, a desktop computer, a laptop computer, a tablet computer, smartwatch, projector, augmented/virtual reality device, and a smartphone.

Those in the art will appreciate that various adaptations and modifications of the above-described embodiments can be configured without departing from the claims. Therefore, it is to be understood that the claims may be practiced other than as specifically described herein.

What is claimed is:

1. A computing system comprising:
   a storage system;
   one or more processors to execute processor-executable process steps stored on the storage system to cause the computing system to:
   acquire a first plurality of magnetic resonance slice images;
   for each of the first plurality of magnetic resonance slice images, determine whether an infarct is depicted in the image and generate a label associated with the image based on the determination;
   acquire a second plurality of contrast-enhanced computed tomography slice images;
   for each of the second plurality of contrast-enhanced computed tomography slice images, determine a corresponding one of the first plurality of magnetic resonance slice images;
   for each of the second plurality of contrast-enhanced computed tomography slice images, associate the contrast-enhanced computed tomography slice image with the label associated with the corresponding one of the first plurality of magnetic resonance slice images;
   acquire a third plurality of non-contrast-enhanced computed tomography slice images;
   for each of the third plurality of non-contrast-enhanced computed tomography slice images, determine a corresponding one of the second plurality of contrast-enhanced computed tomography slice images;
   for each of the third plurality of non-contrast-enhanced computed tomography images, associate the non-contrast-enhanced computed tomography slice image with the label associated with the corresponding one of the second plurality of contrast-enhanced computed tomography slice images; and
   train a network to generate a label based on an input non-contrast-enhanced computed tomography slice image by iteratively inputting the third plurality of non-contrast-enhanced computed tomography slice images into the network, operating the network to output labels corresponding to the input third plurality of non-contrast-enhanced computed tomography slice images, comparing the output labels with the labels associated with each of the third plurality of noncontrast-enhanced computed tomography slice images, and modifying the network based on the comparison.

2. A computing system according to claim 1, the one or more processors to execute processor-executable process steps stored on the storage system to cause the computing system to:

operate the trained network to receive a first non-contrast-enhanced computed tomography image and output a label indicating whether an infarct is depicted in the first non-contrast-enhanced computed tomography image.

3. A computing system according to claim 1, wherein determination of a corresponding one of the first plurality of magnetic resonance slice images for each of the second plurality of contrast-enhanced computed tomography slice images comprises:

detecting first myocardium structure within the first plurality of magnetic resonance slice images;

detecting second myocardium structure within the second plurality of slice images; and registering the first plurality of slice images with the second plurality of slice images.

4. A computing system according to claim 1, wherein the label indicates a location of an infarct.

5. A computing system according to claim 1, the one or more processors to execute processor-executable process steps stored on the storage system to cause the computing system to:

operate the trained network to receive a first non-contrast-enhanced computed tomography image and output an image including the first non-contrast-enhanced computed tomography image and a graphic overlaying a location of an infarct depicted in the first non-contrast-enhanced computed tomography image.

6. A computer-implemented method comprising:

acquiring a first plurality of magnetic resonance slice images;

for each of the first plurality of magnetic resonance slice images, determining whether an infarct is depicted in the image and generating a label associated with the image based on the determination;

acquiring a second plurality of contrast-enhanced computed tomography slice images;

for each of the second plurality of contrast-enhanced computed tomography slice images, determining a corresponding one of the first plurality of magnetic resonance slice images;

for each of the second plurality of contrast-enhanced computed tomography slice images, associating the contrast-enhanced computed tomography slice image with the label associated with the corresponding one of the first plurality of magnetic resonance slice images;

acquiring a third plurality of non-contrast-enhanced computed tomography slice images;

for each of the third plurality of non-contrast-enhanced computed tomography slice images, determining a corresponding one of the second plurality of contrast-enhanced computed tomography slice images;

for each of the third plurality of non-contrast-enhanced computed tomography images, associating the non-contrast-enhanced computed tomography slice image with the label associated with the corresponding one of the second plurality of contrast-enhanced computed tomography slice images; and training a neural network to generate a label based on an input non-contrast-enhanced computed tomography slice image by iteratively inputting the third plurality of non-contrast-enhanced computed tomography slice images into the network, operating the network to output labels corresponding to the input third plurality of non-contrast-enhanced computed tomography slice images, comparing the output labels with the labels associated with each of the third plurality of non-contrast-enhanced computed tomography slice images, and modifying the network based on the comparison.

7. A method according to claim 6, further comprising:

operating the trained network to receive a first non-contrast-enhanced computed tomography image and output a label indicating whether an infarct is depicted in the first non-contrast-enhanced computed tomography image.

8. A method according to claim 1, wherein determining a corresponding one of the first plurality of magnetic resonance slice images for each of the second plurality of contrast-enhanced computed tomography images comprises:

detecting first myocardium structure within the first plurality of magnetic resonance slice images;

detecting second myocardium structure within the second plurality of slice images; and registering the first plurality of images with the second plurality of slice images.

9. A method according to claim 6, wherein the label indicates a location of an infarct.

10. A method according to claim 6, further comprising operating the trained network to receive a first non-contrast-enhanced computed tomography image and output an image including the first non-contrast-enhanced computed tomography image and a graphic overlaying a location of an infarct depicted in the first non-contrast-enhanced computed tomography image.

* * * * *